Sept. 2, 1969 C. S. MITCHELL 3,465,129

OPTICAL READER

Filed May 7, 1965 4 Sheets-Sheet 1

INVENTOR.
CHARLES S. MITCHELL

BY

Lippincott, Ralls & Hendricson
ATTORNEYS

Sept. 2, 1969 C. S. MITCHELL 3,465,129

OPTICAL READER

Filed May 7, 1965 4 Sheets-Sheet 2

INVENTOR.
CHARLES S. MITCHELL

BY

Lippincott, Ralls & Hendricson
ATTORNEYS

INVENTOR.
CHARLES S. MITCHELL
BY
Lippincott, Ralls & Hendricson
ATTORNEYS

INVENTOR.
CHARLES S. MITCHELL
BY
Lippincott, Ralls & Hendricson
ATTORNEYS 3,465,129
Patented Sept. 2, 1969

3,465,129

OPTICAL READER

Charles S. Mitchell, Palo Alto, Calif., assignor to Hewlett-Packard Company, a corporation of California Filed May 7, 1965, Ser. No. 454,059
Int. Cl. G06k 7/00; B65h 5/08, 3/08
U.S. Cl. 235—61.11 16 Claims

ABSTRACT OF THE DISCLOSURE

A pickup mechanism in which a vacuum is drawn between a pair of spaced, parallel, rotating rollers is pivotally mounted for removing data sheets one at a time from the top of a stack of data sheets in an input hopper. The rollers of the pickup mechanism are momentarily prevented from rotating as each data sheet is lifted from the stack and then are released for feeding the lifted data sheet onto a rotary transport unit. A vacuum drawn through perforations in limited peripheral portions of a plurality of annular stationary members holds each data sheet on the transport unit while a plurality of rotary discs having a slightly larger diameter than the annular stationary members drives the vacuum held data sheet past a data mark reading unit. As the data sheets are driven past the end of the limited peripheral portions of the annular stationary members, they are ejected from the transport unit and stacked in the original order in an output hopper positioned beneath the input hopper. A mechanical feedback system adjusts the position of the input hopper to maintain the top of the stack of data sheets placed therein at the proper level for data sheet removal by the pickup mechanism.

The present invention relates in general to apparatus for reading data recorded upon cards or sheets of the type employed in automated data systems.

There have been developed a wide variety of systems for the recording and the handling of data arising in the everyday course of business. Commonly, these systems are referenced to computers and it is well recognized that the capabilities of automated data handling systems are such that their widespread utilization is inevitable. Unfortunately, many of the data handling systems previously developed constitute only mechanical or electronic machines which require input information to be supplied in certain ways that are at least inconvenient, if not impossible. Various types of business generate different types of information in alternative manners and the prior art requirements of stereotype information inputs to automated data handling systems are at least inconvenient for many applications. For example, utilization of conventional punched cards, as required by a wide variety of computers, necessitates the re-arrangement of normally recorded data and commonly requires the establishment of a keypunch department for appropriately recording data for computer handling.

The present invention is particularly directed to the reading of recorded data from a wide variety of media such as marked cards, sheets, and the like. The invention hereinafter described does not relate to the manipulation or handling of data, but, instead, relates only to the production of electrical signals indicative of recorded data. Various mechanical problems are involved in the production of electrical data signals from manually recorded information. Many of these difficulties are overcome by the co-pending patent application Ser. No. 445,975, entitled "Optical Card Reader" and assigned to the same assignee as the present application. While the problems of inverted or reversed card reading, for example, are solved by the above-noted co-pending patent application, additional mechanical problems are also encountered in this field. Thus, for example, in the reading of a stack of cards or sheets containing recorded data, it is extremely important that only a single card or sheet be passed through the reader at a time, for, otherwise, one of them cannot be read. Additionally, the reader itself has been found to pose viarous problems in the viewing of a sufficiently limited area by individual photoresponsive means in the appropriate lighting of such limited area. A further problem normally encountered in data handling is the necessity of manually or mechanically restacking cards or sheets once they are passed through the reader. Conventional optical readers reverse the stacking of data cards or sheets passed therethrough and consequently require restacking of same for further use.

The present invention overcomes the above-noted difficulties and limitations of conventional optical readers for data systems, as well as providing additional advantages in the field. More specifically, the present invention provides an optical reader capable of producing electrical signals indicative of data recorded upon sheets and guarantees the reading of only one sheet at a time from a stack of sheets in the reader. The feed system of the present invention employs a mechanical feedback system which constantly positions the top of a stack of sheets or cards in proper position for individual sheet or card removal and feed into the reading portion of the apparatus. There is also provided herein a check on the number of sheets or cards simultaneously provided to the reading portion of the apparatus for guarding against errors arising from dual card or sheet feed. There is furthermore provided hereby an improved and highly advantageous reading head and photoresponsive mounting therefor which obviates many of the prior art difficulties of optical readers. In addition to the foregoing, the present invention provides an improved and highly advantageous means for gripping and moving data cards or sheets through the reader hereof to insure a flat reading surface.

Various other advantages of the present invention will become apparent to those skilled in the art from the following description of a single preferred embodiment of this invention. The invention is illustrated in the accompanying drawing wherein.

Considering now the present invention in general, it is first noted that the illustrated embodiment of the present invention is adapted to be employed with sheets of paper upon which there are applied markings identifying, for example, components or elements of some units, such as an automobile. Preferably, the sheets of paper are printed with boxes of blanks thereon in predetermined locations and associated with some type of description so that a worker in the field or in a factory, for example, may put an X or the like in appropriate boxes to identify goods or elements thereof. The invention may also be employed with data cards. The physical transport of the marked sheets, as they are hereinafter termed, is accomplished in a rotary manner in distinction to conventional planar transport beds of common optical readers. A plurality of continuously rotating units vacuum grip the sheets which are individually supplied thereto by pickup mechanism adapted to withdraw one sheet at a time from a stack of sheets. The aforementioned pickup mechanism sequentially feeds individual sheets to the rotating transport where they are grasped and rotated past a reader head where electrical signals are produced corresponding to data recorded upon the sheets. The transport means continues to rotate the sheets past the reader head so as to release the sheets in inverted position for restacking of sheets sequentially upside down. This, then, results in the individual sheets being stacked in the same order as they were originally provided to the optical reader, and it is only necessary to invert the entire stack of sheets at the output of the reader to regain the original stacked order of sheets so that they may again be operated upon at will, in accordance with data handling requirements.

The invention provides for "reading" data marks upon cards or sheets, and producing data signals in electrical form, which may then be employed in a wide variety of control or data manipulation systems. In the production of these data signals, there are employed herein light sensors such as light-sensitive transistors, although a wide variety of different types of light sensors may be employed. Electrically, the present invention employs alternating current circuitry and components. Among other advantages, this circuitry provides for the elimination of problems normally arising in connection with spurious signals produced at the leading and trailing edge of sheets passing through the reader.

Figure 1:
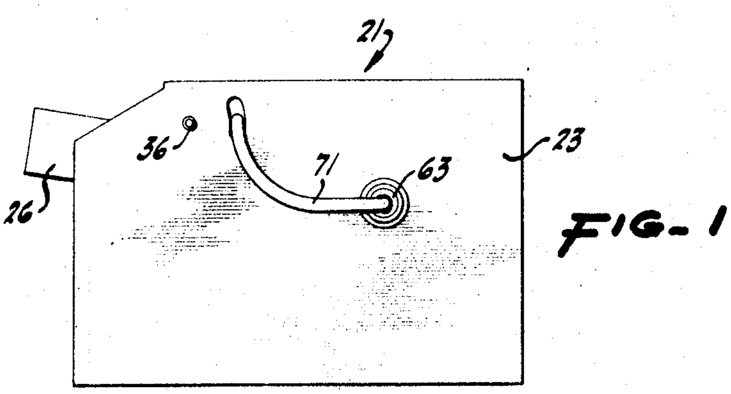
FIGURE 1 is a side elevational view of an optical reader in accordance with the present invention.
Figure 2:
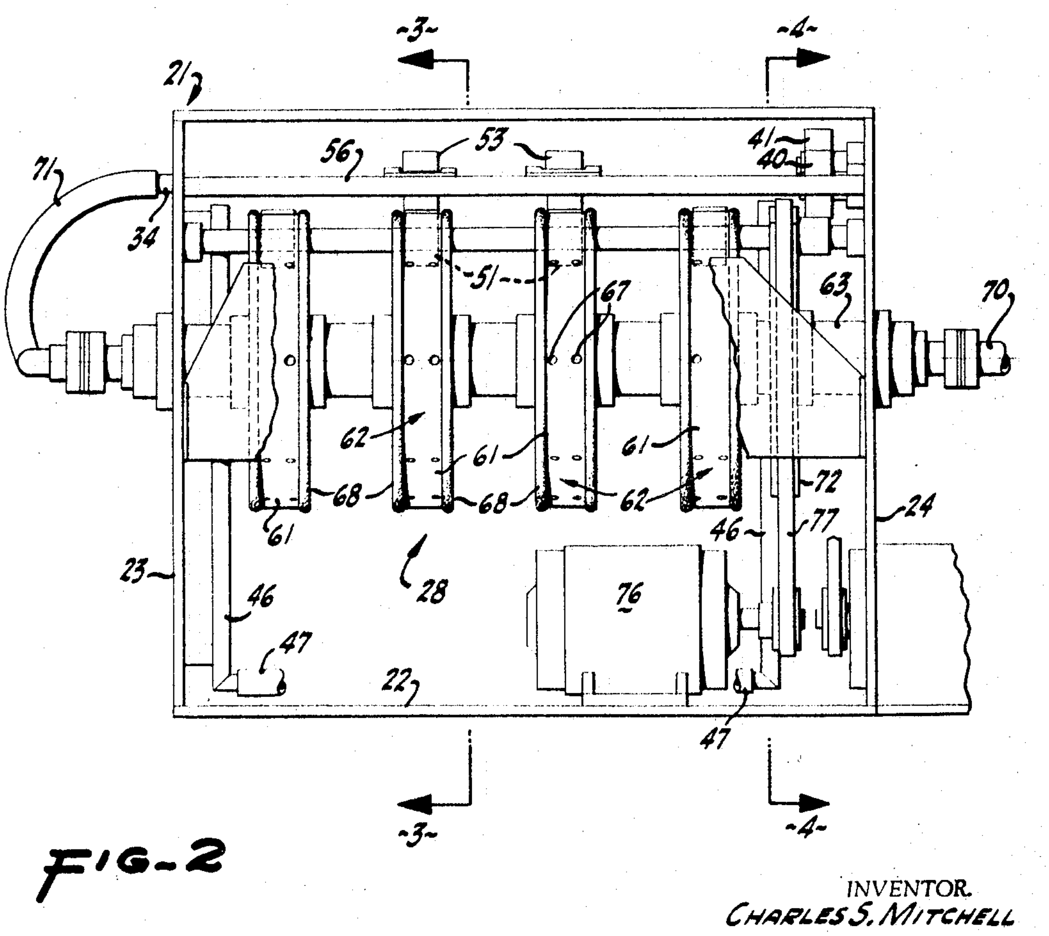
FIGURE 2 is an end elevational view of the optical reader.
Figure 3:
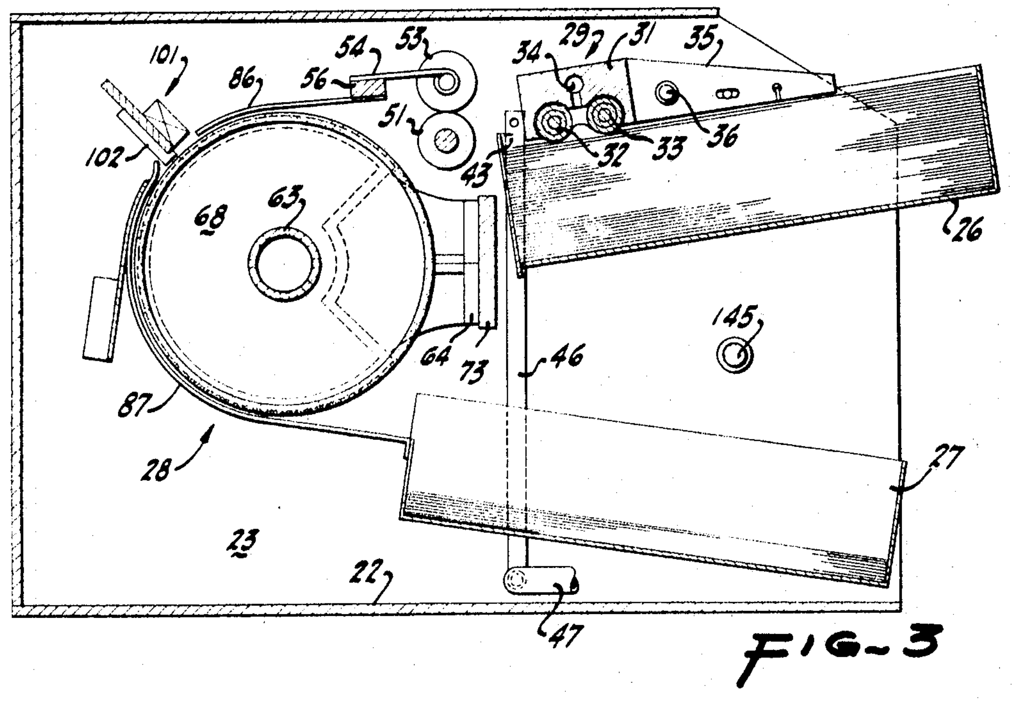
FIGURE 3 is a longitudinal sectional view taken in the plane 3—3 of FIGURE 2.

Considering now a preferred embodiment of the present invention in some detail, and referring first to FIGURES 1 to 4 of the drawing, there will be seen to be provided a housing 21 including at least a bottom wall 22 and side walls 23 and 24. Within the housing 21 there are removably disposed a pair of trays adapted to contain data sheets. An upper tray 26 is employed as a feed tray from which sheets are removed by the reader for reading of data thereon, and a lower tray 27 is disposed to receive sheets ejected from the reading mechanism following reading thereof. This lower tray 27 has an open inner end through which sheets pass as they are stacked in the tray. Rollers on the sides of the housing support the trays in removable relationship to the housings, and, as illustrated, the feed tray is preferably slightly inclined downwardly toward the inner part of the housing and the lower tray is preferably oppositely inclined. The two trays are directed toward reader transport means generally designated herein by the numeral 28 and described in detail below. Data sheets are individually lifted from the feed tray 26 by vacuum pickup mechanism 29, and fed onto the rotary transport 28. Although a number of different types of pickup mechanism may be employed, the illustrated embodiment of the present invention employs a highly advantageous roller vacuum pickup comprising a housing 31 extending laterally off the reader between the side walls 23 and 24 thereof and carrying a pair of parallel longitudinal rollers 32 and 33 journalled in the housing ends for rotation. The housing is formed very closely about the side and top roller surfaces, as illustrated in FIGURE 3, and the rollers extend slightly below the bottom of the housing for engaging sheets to be picked up by the mechanism. The housing furthermore defines a vacuum manifold 34 adapted for connection to a source of vacuum and having openings to the space betwen the rollers 32 and 33 longitudinally of the housing. The rollers are slightly separated from each other, as of the order of ⅛ of an inch, so that vacuum from the manifold 34 will serve to draw a sheet against the under side of the rollers when the pickup mechanism is resting on a stack of sheets.

The pickup mechanism is pivotally mounted and has the rollers thereof rotatably driven in the same direction to move sheets picked up by the mechanism toward the back of the reader. Pivoting of the pickup housing 33 is accomplished by the provision of a forwardly extending arm 35 at each end of the housing with a pivot connection of same at 36 forwardly of the pickup housing 31. Control over the pivotal position of the pickup may be provided in a plurality of different ways, and there is illustrated a solenoid 37 adapted to be normally energized and periodically de-energized at controlled time periods. The solenoid 37 is connected through a compression spring 38 to a housing arm 35 so as to normally urge the pickup housing into horizontal or unpivoted position resting upon a stack of sheets in the feed tray 26. A counterbalance spring 39, normally in tension, is connected between one of the arms 35 and the reader housing wall 24 below the arm to normally pull the arm downward behind the pivot point 36 to thus pivot the pickup housing upwardly when the solenoid is de-energized. A dashpot or shock absorber 44 may be provided to prevent oscillations of the pickup housing during use thereof.

The rollers 32 and 33 of the pickup are adapted to be simultaneously rotated at the same angular velocity when the pickup housing 31 is pivoted upwardly from the top of the feed tray 26. This may be accomplished from one of a series of driven feed rollers or shaft rollers 51, described below. The rollers of the pickup mechanism may be connected together as by means of a belt about roller shafts at one end of the housing, and a pair of idler wheels 40 and 41 are shown to be rotatably mounted on the side wall 24 in engaging relationship with each other, and one of these idler wheels 40 engages a driven shaft roller 51, so that the idler wheels are continuously rotated. A shaft or wheel of the roller 32 at one end of the pickup housing 31 engages this rotating wheel 41 when the pickup housing is pivoted upwardly, so as to drive the two pickup rollers 32 and 33 in a counterclockwise direction, as viewed in FIGURE 4. The diameters of the idler wheels 40 and 41 are chosen so that the pickup rollers 32 and 33 have the same surface velocity of motion as the surface of the feed rollers 51. The purpose of this relationship is described below. A further element of the pickup mechanism is a friction brake 42 disposed laterally of the reader housing beyond the end of the pickup housing in position to be engaged by the end of a pickup roller shaft when the pickup housing is rotated downwardly toward a stack of sheets in the feed tray. This brake may comprise only a cantilever-mounted friction block against which a roller shaft end is pressed to stop rotation of the pickup rollers when they pivot downwardly toward a stack of sheets in the feed tray.

In operation, the pickup mechanism of the present invention has a steady source of vacuum applied thereto, so as to thus grip the top sheet of a stack of sheets in the feed tray when the pickup mechanism is pivoted downwardly to rest the pickup rollers on this sheet. A timed de-energization of the solenoid 37 then allows the counterweight spring 39 to swing or pivot the pickup housing about the pivot point 36, and thus to raise the vacuum-gripped sheet from the feed tray. Small flexible metal fingers 43 at the inner end of the feed tray bend the edge of the sheet as it is raised by the pickup mechanism, so that the sheet actually snaps past these fingers to further guard against possibility of picking up two sheets, one on top of the other. As the pickup housing 31 is rotated upwardly to engage the shaft of rollers 32 with the rotating idler wheel 41, the pickup rollers 32 and 33 will be rotated so as to move the vacuum-gripped sheet toward the rear of the reader housing over the top of the feed rollers 51. The sheet is moved at the same velocity as the surface velocity of the feed roller 51, so that no buckling or undue tensioning of the sheet will occur as it is transferred from the pickup mechanism to the feed rollers and then to the transport means 28. It is noted at this point that the feed rollers 32 and 33 may be formed of metal with integral end shafts extending through the ends of pickup housing 31, and furthermore, that the rollers are covered with a material having a high coefficient of friction with paper. It has been found advantageous to coat the pickup rollers with a thin film of polyurethane. This, then, insures the movement of paper in accordance with rotary motion of the rollers. It is further noted that the slight separation of the pickup rollers through which vacuum acts to draw the paper against the rollers causes a curve to be formed in the paper, for it is drawn slightly into this gap between the rollers. This is highly advantageous in further guarding against the possibility of raising two sheets of paper with the pickup mechanism. As the rollers rotate with a sheet of paper held thereagainst, it may be considered that a wave passes lengthwise along the paper corresponding to the curvature of the paper between the rollers, and this tends to drop any second sheet which might otherwise adhere to the undersurface of the sheet picked up for reading.

It is to be appreciated that the pickup roller drive and pickup housing pivoting may be accomplished in a variety of ways; however, it is important that pickup housing be pivoted about the point displaced from the housing itself, or at least from the axis of roller 33, in order that upward pivoting of the housing will not cause the back roller 33 to press downwardly on the stack of sheets in the feed tray. It is furthermore necessary for the pickup rollers to be stationary when they engage the top sheet in the feed tray, for otherwise they would tend to push or drive the gripped sheet into the end of the feed tray. This stationary condition of the pickup rollers is attained by the brake 42, which positively stops or locks the pickup rollers from rotating until the pickup housing is pivoted upwardly to disengage the brake. As the housing moves upwardly with the paper firmly gripped thereunder, the pickup rollers will be rotated to move the paper toward the feed rollers 51 and the rotary transport means 28. As the paper leaves the pickup mechanism, the solenoid 37 is energized to push the arm 35 upwardly and hence to swing the pickup housing down about the pivot point 36, so that the brake 42 operates to stop the pickup rollers which then come in contact with the upper surface of the top sheet in the feed tray 26. This mechanism does require a substantially uniform position of the top sheet in the feed tray, and the present invention makes particular provision for automatic feed tray positioning, as described below.

In order to further insure lifting of only a single sheet from the tray by the pickup mechanism 29, provision is herein made for "fluffing" the sheets by blowing air laterally thereat from opposite sides of the housing. This is herein accomplished by the provision of a pair of vertical air pipes 46 mounted one against each side wall 23 and 24, adjacent the inner end of the feed tray 26 and having perforations therein directed toward the tray. Air lines 47 extend from these pipes to a source of air under pressure. Air is thus blown into the tray 26 from opposite sides thereof adjacent the inner end of the tray through the perforations in the pipes 46, so as to separate data sheets in the tray and guard against the possibility of two sheets sticking together when raised by the pickup mechanism 29.

As individual sheets are raised from the tray 26 by the pickup mechanism 29, they are moved into position to be engaged by shaft rollers of feed rollers 51 spaced laterally apart across the housing immediately ahead of and slightly above the rotary transport mechanism 28. These rollers may, for example, be formed integrally with a shaft journalled in the side walls of the housing and having a pulley wheel 52 adjacent one end thereof. The shaft rollers are rotated by means described below. Immediately above at least two of the rollers of the shaft 51 are disposed a pair of freely rotatable rollers 53, carried by resilient spring clips 54 secured to a transverse bar 56 extending between the side walls of the housing above the transport 28. The spring mounting clips 54 press the freely rotatable rollers 53 against shaft rollers 51, so that with driven rotation of the latter, the upper rollers 53 will be rotated thereby. Consequently, as a sheet of paper is moved forwardly over the top of the shaft rollers 51 by the lift mechanism 29, it will be engaged by the shaft rollers and upper rollers 53, so as to be drawn forcibly between the sets of rollers and moved toward the back of the housing onto the rotary transport 28.

Figures 5, 6:
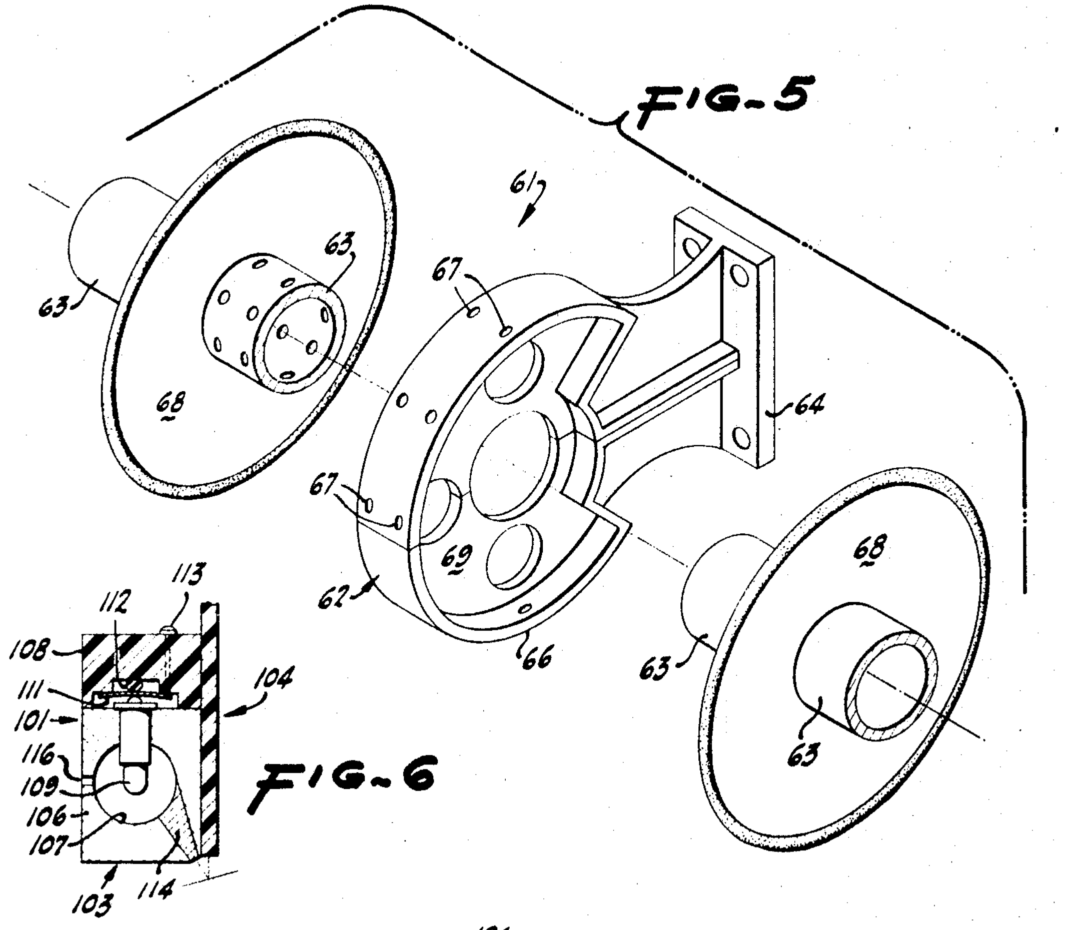
FIGURE 5 is a partial exploded view of the rotary transport means of the invention.
FIGURE 6 is a transverse sectional view through the read head of the invention.

With regard to the rotary transport 28 of the present invention, reference is made to FIGURE 5 of the drawing comprising an exploded view of a portion of the transport drum. The portion of the drum illustrated in FIGURE 5 corresponds to a single drum unit 61 and will be seen from FIGURE 2 that some four of such units are illustrated in that embodiment of the invention. An individual unit 61, as shown in FIGURE 5, includes a central stationary member 62 having a central aperture, through which there extends a perforated hollow shaft 63. The stationary unit has somewhat the general configuration of a central plate with a rear flange 64 and a circular end with an annular wall 66 on both sides thereof extending about some 270 degrees thereof with a transverse wall of some configuration closing the remaining 90 degrees facing the rear flange 64. A plurality of small apertures 67 are formed through the annular wall 66 from the top about 180 degrees circumference to the bottom. Upon each side of the stationary unit 62, there is disposed a flat circular plate or disc 68 which fits against the edge of the annular wall 66 in slidable relation thereto. The diameter of the circular discs 68 is the same as the diameter of the circular end portion of the stationary member, and the discs are fixed to the central shaft 63 extending therethrough so as to rotate therewith. The shaft 63 is adapted to be connected to a source of vacuum. The interior of the hollow rotating shaft 63 communicates with chambers 69 formed betwen the central plate of the stationary member and the discs against the edges of the annular wall 66. Consequently, air is drawn through the apertures 67 in the annular wall of the stationary member, through the chamber 69 into the hollow shaft 63. The discs 68 are each provided with circumferential O-rings, preferably formed of rubber or the like, and mounted on the discs by resilient engagement with the V-grooves circumferentially about the disc circumferences. These O-rings then extend slightly above the outer surface of the annular wall 66 of the stationary unit. It will be seen from FIGURE 5 that the stationary unit may be formed as two pieces joined together along a horizontal center line, and the central opening through the stationary unit is made sufficiently large that the shaft readily rotates therein.

A plurality of the units 61 together comprise the rotary transport 28, and the central shaft 63 of this combination is journalled in the side walls of the housing with one end of the shaft connected by a hose or the like 70 to a vacuum source for drawing a vacuum through the disc aperture 67. The other end of the shaft is connected by a hose 71 to the vacuum manifold 34 of the pickup mechanism 29. At one end of the shaft adjacent the side wall 24, there is provided a pulley wheel 72 affixed to the shaft for rotation therewith. A central support plate 73 is mounted transversely across the housing between the side walls thereof, and upon this plate there is mounted the individual stationary units of the rotary transport 28 by connection of the flanges 64 thereto.

Figure 4:
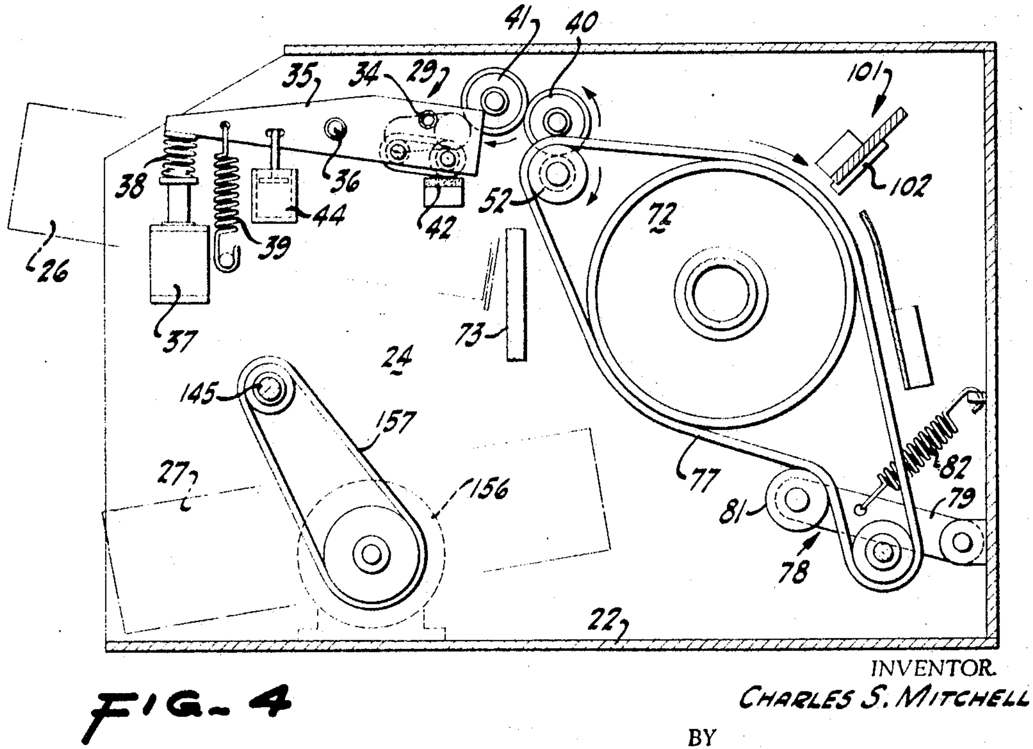
FIGURE 4 is a longitudinal sectional view taken in the plane 4—4 of FIGURE 2.

Rotation of the rotary transport 28 is accomplished by belt drive with power supplied from a small electric motor 76 mounted on the floor 22 at the rear of the housing. A belt 77 extends from a pulley wheel on the motor shaft about the pulley wheel 72 on the transport shaft 63, and also about the pulley wheel on the roller shaft 51. As shown in FIGURE 4, the belt thus engages the large pulley wheel 72 of the transport means about portions of the circumference thereof which is sufficient to drive the transport means. As also shown in FIGURE 3, belt tensioning means 78 are preferably provided to maintain belt tension, and also to resiliently load the belt so that the danger of belt breakage is minimized. This belt tensioning means may comprise a lever arm 79 pivotally mounted at its lower end and having a wheel 81 rotatably mounted at its upper end. A spring 82 is secured to the arm adjacent the top thereof, and also to the side wall 24 so as to pull the arm toward the rear of the housing with the wheel 81 engaging the belt 77, as indicated. It will be appreciated that with a single belt drive the input rollers 51 and 53 rotate at the same surface velocity as the transport means. This is desirable in order that the input rollers grip and move the individual sheets onto the transport means where they are then gripped and rotated about substantially 180 degrees of the circumference for discharge into the tray 27 without buckling. There may also be provided guard plates 86 extending over the top of the transport means from attachment to the transverse bar 56 and disposed between the individual transport units 61. Additionally, there may be provided a lower guard plate 87 extending about the back and underneath the entire transport means, as indicated, but separated from the upper guard plates 86 to permit placement of reading means adjacent the transport drum for producing electrical signals corresponding to data upon the sheets.

Figure 7:
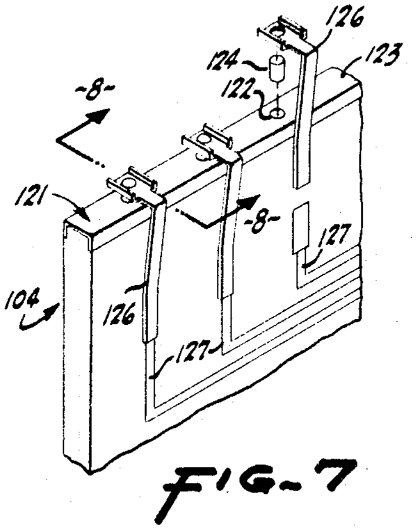
FIGURE 7 is a partial perspective view of the light sensor card of the read head in inverted position.
Figure 8:
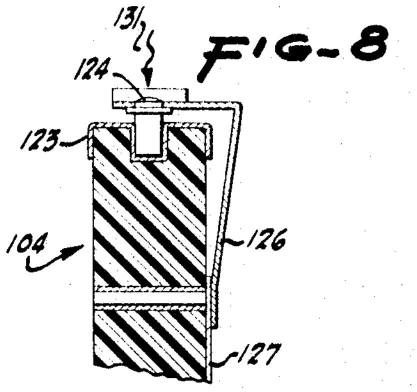
FIGURE 8 is a partial sectional view through the light sensor card taken in the plane 8—8 of FIGURE 7.

Considering now the read head 101 of the present invention, it will be seen that this unit is mounted transversely across the housing between side walls 23 and 24 thereof and may be secured in fixed position by mounting lugs 102 provided upon each of these side walls. FIGURES 6–8 illustrate the read head in some detail, and it will be seen therefrom that the head is actually comprised of two, separate units, a light source block 103, and a sensor plate 104. The light source block may be formed of a metal bar 106 having a central longitudinal aperture 107 therethrough. Atop the metal bar 106, there is affixed an insulating bar 108 having a grooved under surface, as indicated in FIGURE 6. A plurality of small light bulbs 109 extend vertically into the bar 106 from the top through spaced vertical bores in the bar, with the light-emitting ends thereof disposed in the longitudinal aperture 107 of the bar. These light bulbs 109 have a bayonet-type base with a flange thereabout resting about the upper surface of the metal bar 106. In assembly, the lights are placed in the metal bar and a flexible copper strip 111 is place over the center contact of the light bulbs. The insulating bar 108 is then placed in position with a resilient O-ring, or the like 112, in the groove on the underside of the insulating bar, and, consequently, atop the copper strip. As the insulating bar is tightened onto the metal bar by screws or the like, the copper strip is flexed by shoulders in the groove of the insulating bar, as indicated in FIGURE 6, so as to firmly engage the light bulbs and to hold them in fixed position. The resilient O-ring 112 compresses above the copper strip to insure a good electrical contact between the copper strip and central contact of each of the bulbs. In this arrangement, electrical connection is made from the copper strip to a terminal 113 on the insulating bar 108, and electrical connection is then made from this terminal through an appropriate power supply to the metal bar 106, so as to light the lamps 109.

Light emitted from the bulbs 109 is channeled by an elongated light pipe 114 having a tapered cross-section and mounted in the lower metal bar 106 of the unit with the large end of the light pipe forming a part of the side wall of the central aperture 107, and the small end of the light pipe extending to the lower rear corner edge of the light source 103. This light pipe 114 may be readily formed of plastic, or the like, with the tapered sides painted, slivered, or the like, so that light entering the elongated large end of the pipe will be emitted from the very narrow elongated outlet end of the pipe. There are also provided a plurality of small lateral apertures 116 through the front side of the bar 106. A lateral aperture 116 is provided for each of the light bulbs 109 in the unit, and in alignment therewith, so as to provide a ready visual check on correct operation of each bulb by one using the reader of this invention.

Figure 9:
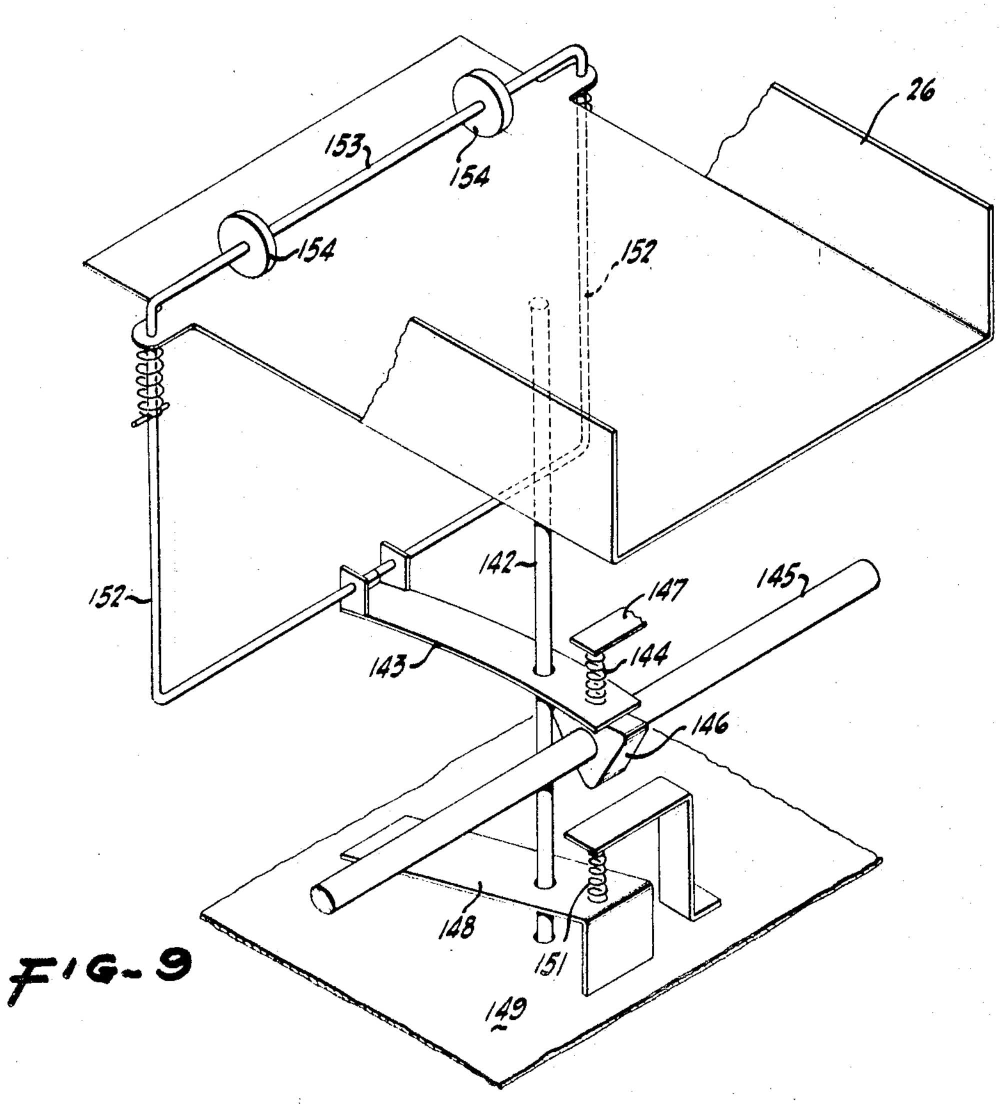
FIGURE 9 is a schematic perspective view of the automatic tray positioning mechanism of the invention.

The light sensor card 104 actually comprises a printed circuit board or card, upon which light sensors are mounted along the bottom edge. FIGURES 7 and 8 illustrate the mounting of light sensors upon this card, and in both of these figures the card is inverted from normal position in order to show the location and manner of light sensor mounting. The card 104 is, of course, formed of an electrically insulating material and the bottom edge 121 has small holes 122 drilled therein in longitudinal alignment. These holes are drilled with square bottoms, and the entire bottom edge of the card is then plated with a metal such as copper, to form a common electrical contact 123 for light sensors 124 adapted to be mounted upon this card edge. Individual light sensors are fitted into the small holes 122, as indicated in FIGURE 9, and thus each makes electrical contact with the coated contact 123. Each of the light sensors is held in position and the additional necessary electrical contact thereto is made by a spring clip 126. This clip has an upper apertured portion which fits down over the top of the light sensor 124 disposed in the hole 122 of the card edge and bears upon the lateral lugs of the light sensor. The clip 126 also has a depending portion which may be bent, somewhat as illustrated in FIGURE 8, and the lower end thereof is attached, as by soldering, to the printed circuit board at an electrical connection. Conductors 127 are provided upon the board in conventional manner extending from individual spring clip connections to a board edge for connection to outside conductors with standard printed circuit board connnectors. At the connection of the spring clips 126 to the board, there may be provided apertures through the board with the sides thereof plated with the metal, so that electrical connections may be printed on both sides of the board, if desired. The illustrated and described embodiment of the present invention employs a light sensor such as a type LSX 600 NPN Planar Silicon Light Sensor, manufactured by Texas Instruments Corporation and commercially available. This particular light sensor has a collector contact at the bottom of the sensor so as to thus be in engagement with the common conductor 123, and has an emitter contact at the laterally extending lugs, herein shown as engaging the spring clip 126. The top of the sensor is a light-sensitive base of the transistor, and, consequently, light, as indicated at 131 in FIGURE 8, will activate the sensor to produce an output signal with the application of appropriate voltages to the emitter and collector hereof through the connections described above.

The light sensor card or plate 104 is mounted immediately adjacent the back side of the light source block 103, as shown in FIGURE 6, with the light-sensitive edge 121 of the card pointed downwardly directly beside the lower output end of the light pipe 114. Consequently, passage of a data sheet or the like immediately below the reader head 101 results in light being focused thereon along a line laterally across the sheet, and the amount of light reflected from the sheet is determined by marks thereon. In the absence of a mark, a substantial amount of light will be reflected and, consequently, will energize the light sensors 124. However, the presence of a black mark, such as an X or the like, at any lateral location across the line of light on the sheet will materially diminish the amount of reflected light, and consequently at that point the photosensor will not be energized sufficiently to produce an output signal.

The present invention additionally provides for automatically positioning the feed tray 26 in proper position for the pickup mechanism to engage and pick up individual data sheets therefrom. With a stack of sheets placed in the feed tray and consecutively passed through the reader of the present invention, the height of the stack will necessarily decrease, and thus the present invention provides for automatically raising the feed tray to maintain the top of the stack at substantially the same horizontal level to facilitate paper pick up. This tray positioning mechanism is illustrated in FIGURE 9, and will be seen to be based upon an infinite ratchet and holding means. The feed tray 26 is supported upon vertical hardened steel shaft 142. An advance binding plate 143 is formed with a central aperture through which the shaft 142 extends, and one end of this binding plate is forced by a spring 144 against a continuously rotating cam 146. The cam is mounted upon a transverse shaft 145 which may be rotated by a separate small electric motor 156 through a belt 157. Preferably, the cam 146 is formed with a plurality of cam lobes, so as to reciprocate the advance binding plate a number of times for each shaft rotation. The spring 144 is disposed in compression between the upper side of the advance beinding plate and a fixed member 147 secured to one or both of the housing walls. As the spring-loaded end of the advance binding plate is reciprocated by the cam 146, it will bind against the vertical shaft 142 and raise the shaft an amount equal to the cam lift, because of this binding action between shaft and plate. Dropping of the shaft upon the return movement of the advance binding plate is prevented by a holding binding plate 148 which is mounted with one end fixed to a structural portion 149 of the housing, and has the other end urged downwardly by a compression spring 151, as indicated. This holding binding plate 148 is centrally apertured to accommodate extension of the vertical shaft 142 therethrough. It will thus be seen that following shaft lift by the advance binding plate 143, the shaft will bind in the opening through the holding binding plate 148 to prevent the shaft from slipping back down.

While the above-described infinite ratchet and holding means is suitable for raising the feed tray in accordance with cam lift, the present invention further provides for a feedback mechanism to indicate the level of the top of the stack of sheets in the feed tray to the advance binding plate. This is herein accomplished by a U-shaped rod 152 secured to the advance binding plate 143 at the opposite end thereof from the spring 144, and carrying a transverse rod 153 riding upon the top of the stack of sheets, as by means of wheels 154 on the rod. The rod 153 is spring-loaded to press downwardly upon the top of the stack of sheets, and is firmly affixed to the U-shaped rod 152 so that the U-shaped rod and consequently one end of the advance binding plate, move downwardly as the height of the stack of sheets decreases. Sufficient downward movement of the back end of the advance binding plate 143 then causes the plate to bind on the shaft 142 with each lift of the cam and consequently to incrementally move the shaft upwardly. When the feed tray is moved upwardly in the above-mentioned manner to the proper position thereof for pick up of sheets therefrom, the back end of the advance binding plate will have been raised sufficiently that vertical oscillation of the front end of the plate by the cam 146 will not cause the plate to bind against the shaft, and consequently the shaft will not be raised, even though the advance binding plate is reciprocated by the cam. When the level of the stack of sheets drops sufficiently, the feedback mechanism will have lowered the rear end of the advance binding plate adequately for reciprocation of the front end to cause the plate to bind against the shaft and jack the shaft upwardly. It will thus be seen that the mechanism provides for automatically positioning the top of the stack of sheets in the feed tray at proper vertical level for the pickup mechanism to engage the top sheet by vacuum and lift it from the tray for feeding it into the rollers of the reader.

Figure 10:
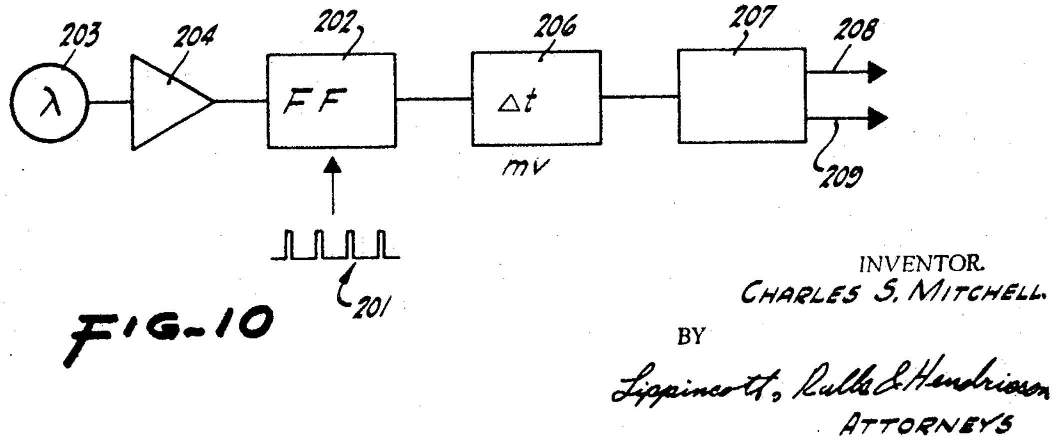
FIGURE 10 is a schematic representation of electrical circuitry of the invention.

Electrical circuitry of the present invention serves to produce useable output signals representative of data marks upon sheets passed through the reader. It will be appreciated that the individual light sensors are laterally spaced across the path of sheets moving through the reader so as to be aligned with separate positions that may be marked upon the sheet. It is not, however, sufficient for the output signal to indicate only the lateral position of a mark on the sheet, for it is also necessary to identify the longitudinal position of the mark on the sheet. This is herein preferably accomplished by the utilization of clock marks on the side of the sheet, and the production of clock pulses therefrom. This is schematically illustrated in FIGURE 10 by a series of clock pulses 201 representing electrical pulses produced by printed marks along the side of a data sheet in position to be read by one light sensor of the read head. These clock pulses are applied to a flip-flop circuit 202 to alternate the conducting condition of the circuit. Data signals produced at a light sensor 203 are fed through an amplifier 204 to the flip-flop circuit. This flip-flop is placed in condition to transmit an output signal during the presence of a clock pulse thereat, and consequently a mark signal from the light sensor 203 occurring during the presence of a clock pulse at the flip-flop will produce an output signal that is then applied to a single-shot multivibrator 206 having a predetermined duration of conducting condition and producing an output signal that operates a relay, or the like 207, to complete a signal circuit. Output signals from the flip-flop circuit 202 are preferably negative in polarity, so as to preclude problems otherwise arising from leading and trailing edge transient pulses which will be noted to be normally positive. The circuit described above is an alternating current circuit with alternating current amplification, and the flip-flop circuit 202 is triggered by the leading edge of the clock pulse and reset by the trailing edge. The data signal is actually produced from a power supply connected to one of the leads 208, so as to establish a substantial data signal in the lead 209 when the relay or switch 207 is closed.

Operation of the present invention is accomplished by placing a stack of data sheets in the feed tray 26 and inserting the tray in the housing. Vacuum is supplied through the hose 70 to the perforated shaft 63 of the transport means, and thence through the hose 71 to the pickup means 29. The two electric motors 76 and 156 are energized from any convenient power supply, so as to rotate the shaft 38 and also to rotate the transport means and shaft rollers 51. The fluffer pipes 46 are connected to a suitable source of air by the hoses 47, and the read head and electrical circuitry are energized. The pickup mechanism 29 then engages the top sheet in the tray by vacuum gripping and with solenoid deactivation pivots to raise the sheet and then rotate the rollers 32 and 33 to move the sheet and place the leading edge thereof between the rollers 51 and 53. The vacuum of the pickup may remain "on" all of the time and the sheet smoothly moves onto the feed rollers and is gripped between the rollers 51 and 53 to move onto the transport means. As the paper moves onto the transport means, it is drawn tightly against the rotating discs 68 by the vacuum through the apertures 67 in the stationary members 62. The O-rings about the rotating plates 68 extend a few thousandths of an inch above the annular stationary members, so that the vacuum draws the paper against the rings about its rotating discs and the sheet is rotated about the transport means to the bottom hereof past the read head 101. Inasmuch as paper does not readily bend into compound curves, it will not be laterally curved on the transport means for it is already curved in passage about the transport means. Relatively tight fits between the rotating discs and stationary members of the transport means limit the air flow, and consequently only a very small amount of air flow is required to hold the sheet against the edges of the rotating discs so that it rotates therewith. Consequently, the sheet is absolutely smooth as it passes the read head, which is very closely spaced from the outer surface of the sheet to shine light in a fine line along an absolutely straight portion of the sheet as it moves past the head. The sheet continues on about the circumference of the transport means until it reaches the bottom whereat the absence of vacuum openings releases the sheet, so that it is ejected back toward the front of the housing into the lower tray 27. It is noted that by turning the top rollers 53 slighly inwardly toward the front of the housing, there is established a lateral tension on the sheet to further insure that the sheet is completely smooth in passing about the transport means. It has been found that even crumpled sheets or those with ragged or bent edges are readily handled by the reader hereof which smoothly picks up each sheet and feeds it into the transport means which flattens the sheet and moves it past the reader head to dispose consecutive planar sections to the head for perfect reading thereof.

Insofar as the read head itself is concerned, the lamps 109 are energized to produce light which is directed by the light pipe 114 into a thin line of light laterally across data sheets passing beneath the head and the diminution of reflected light caused by data marks on the sheet causes a change in conductivity of particular light sensors to produce signals employed in circuitry such as that of FIGURE 10 to establish output data signals corresponding to data marks on the sheet. All portions of the read head 101 are extremely simple and readily serviced, for the individual light sources may be readily replaced and likewise the individual light sensors may be readily replaced as required, inasmuch as these latter elements are not permanently affixed, but are only held in position by spring clips 126. It will be noted also that the individual data sheets are restacked in the same order as they were placed in the reader. It is only necessary to invert the stack of sheets in the lower tray 27 to have the entire stack of sheets in the same condition as originally. This is highly advantageous, inasmuch as it precludes further handling of the sheets to restack them in original order.

It will be seen from the foregoing description of a single, preferred embodiment of the present invention that there is provided an improved optical reader for cards or sheets containing data. The feed tray containing the sheets is automatically maintained in proper vertical position for optimum action of automatic pickup means which removes individual sheets from a stack thereof in the tray, and feeds them onto curved transport means which grip the sheets by vacuum and rotate the sheets past the read head of improved and advantageous structure. The utilization of rotating discs and vacuum holding of data sheets thereagainst to move the sheets past the read head is highly advantageous and provides a material advantage over planar transport means for readers. It is again noted that the forced curvature of the sheet in passage through the reader tends to preclude any other sheet curvature and, in fact, to smooth out wrinkles or the like, which might otherwise occur in the sheet. This is highly important in guaranteeing the presentation of a flat sheet surface in close proximity to light sensors of the read head and precludes a major source of errors present in many optical readers. Furthermore, the physical structure of the present invention is markedly simple, and admits of various modifications and variations, particularly to include additional indicating or control means as may be desired. It is, for example, possible to provide edge detection means in order to gate the circuitry on and off in accordance with the presence or absence of a data sheet under the read head, and also to provide means for control or indication of multiple sheet passage through the reader. The optical reader hereof is also readily serviced, for all of the elements thereof are quite accessible and portions likely to require replacement are easily removed and replaced.

Although the present invention has been described above in connection with a single, preferred embodiment thereof, it is not intended to limit the invention to the precise terms of the description or details of the illustration. Reference is made to the appended claims for a precise delineation of the true scope of this invention.

What is claimed is:

1. An optical reader for data sheets comprising rotary transport means having rotating members and stationary perforated members connected to draw a vacuum radially inward for holding data sheets against the rotary members, a read head including a light source and a light sensor unit disposed in close proximity to the periphery of said transport means for producing electrical signals corresponding to data on data sheets, tray means adapted to contain data sheets, vacuum pickup means lifting individual sheets from said tray means, feed means gripping lifted sheets and feeding same onto said rotary transport means, and lift mechanism automatically positioning said tray means in position for said pickup means to grip a data sheet thereon.

2. An optical reader as set forth in claim 1, further defined by said light sensor unit comprising an insulating printed circuit board having aligned depressions along a reading edge thereof and a common electrical connection therealong, a plurality of light sensors disposed one in each of said depressions with a terminal of each contacting said common connection, and a plurality of resilient contacts individually connected to separate points on the board and each engaging a single light sensor in electrically contacting and retaining relationship.

3. Automatic positioning means for a platform adapted to carry a stack of elements successively removed therefrom to maintain the top of the stack at substantially the same location, comprising a movable shaft carrying said platform, an advance plate having a sharp-edged aperture therethrough with said shaft extending through the aperture in close spacing to the edge thereof, means mounting one end of said advance plate, a rotating cam engaging the other end of said plate for reciprocating same to incrementally raise the shaft by binding of the plate aperture edges thereagainst each time the plate end reciprocates with the other plate end held in a sufficiently downward position, and means holding the shaft from slipping downward, the means mounting the other end of the advance plate including a feedback extension over the top of the platform and bearing downwardly upon the top of elements stacked thereon for positioning the end of said advance plate in accordance with the position of the top of a stack on said platform.

4. An improved optical reader for data sheets, said optical reader comprising a rotary transport unit including a plurality of spaced and axially aligned generally cylindrical stationary members, a plurality of rotatable discs disposed beside said stationary members to define a plurality of chambers having circumferential openings through which a vacuum is to be drawn, said rotatable discs having circumferential portions extending radially outward of said stationary members, a hollow rotatable shaft extending centrally through said stationary members and having openings therethrough in alignment with said chambers to provide a passage between the circumferential openings in said chambers and a vacuum source connected to said rotatable shaft, said shaft carrying said discs for rotating them with respect to said stationary members, reader means including at least one light source and a plurality of light sensors, said reader means being disposed adjacent to said transport unit for producing electrical signals corresponding to data upon the data sheets carried by the transport unit, and feeder means for feeding single data sheets onto said transport unit where they are vacuum gripped against said discs through the circumferential openings in said chambers and rotated by said discs past said reader means.

5. An improved optical reader as set forth in claim 4 wherein said feeder means comprises a pickup mechanism including a pair of spaced parallel rollers and means for continuously drawing a vacuum therebetween, means for pivoting said pickup mechanism onto a stack of the data sheets to vacuum grip the top sheet thereof against said rollers and for pivoting said pickup mechanism to lift the vacuum-gripped top sheet, and means for rotating said rollers to feed the lifted vacuum-gripped top sheet to said rotary transport unit.

6. An improved optical reader as set forth in claim 5 wherein said rollers are coated with a material that has a high coefficient of friction with paper and wherein said pickup mechanism has a pivot mounting away from said rollers.

7. An improved data sheet reader comprising a rotary transport having means for vacuum gripping data sheets fed thereto and rotating them about substantially one hundred and eighty degrees into a receiving means, a read head disposed adjacent to the periphery of said rotary transport for producing electrical signals representative of the data on said sheets, means for holding a stack of data sheets, pickup means including a pair of spaced parallel rollers with means for drawing a vacuum therebetween to vacuum grip individual data sheets against said rollers, means for controllably pivoting said pickup means to raise a vacuum-gripped data sheet from said stack, and drive means for rotating said rollers and said rotary transport means at the same surface velocity to smoothly feed the raised data sheet from said pickup means to said rotary transport.

8. An improved data sheet reader comprising a rotary transport having at least one stationary member positioned between a pair of adjacent rotary members to define a chamber having an opening through which a vacuum is drawn to hold a data sheet against the rotary members while they move it about substantially one hundred and eighty degrees into a receiving means, a read head disposed adjacent to the periphery of said rotary transport for producing electrical signals representative of the data on the data sheet, holder means for holding a stack of data sheets, and a lift mechanism for automatically raising said holder means to maintain the top of the stack in position for engagement with said pickup means so that individual sheets may be removed from the stack.

9. An improved optical reader as set forth in claim 8 wherein said lift mechanism comprises a vertically movable shaft carrying a tray for holding a stack of data sheets, an advance binding plate having an aperture through which said shaft extends, a rotating cam adjacent to one end of said plate, means for holding said plate against said cam, feedback means for riding upon the top of a stack of data sheets on said tray and for carrying the other end of said plate whereby the plate binds against the shaft to incrementally raise the shaft as data sheets are removed from the top of the stack of data sheets, and means for holding said shaft from dropping when said plate is not raising the shaft.

10. A rotary transport for flexible sheets, said transport comprising a plurality of axially aligned and generally annular stationary units of like diameter, a plurality of discs disposed adjacent to the sides of said stationary units to define a plurality of chambers with circumferential openings, said discs extending slightly radially outward of said stationary units, and a hollow rotatable shaft extending through said stationary units and carrying said discs for rotating them with respect to said stationary units, said hollow shaft being connected to a vacuum source and having openings therethrough aligned with said chambers to provide a passage between the vacuum source and the circumferential openings of said chambers so that sheets fed onto said rotary transport are vacuum gripped as they are moved about the rotary transport by said discs.

11. A rotary transport as set forth in claim 10 wherein each of said discs has an adherent rubber ring about the periphery thereof for gripping sheets fed onto said rotary transport and the circumferential openings of said chambers comprise perforations through limited circumferential portions of said generally annular stationary units so that sheets fed onto said rotary transport are vacuum-gripped only while they are moved about a limited circumferential portion of the rotary transport.

12. An improved optical reader for data sheets, said optical reader comprising a feed tray for carrying a stack of data sheets, a rotary transport unit, pickup means for vacuum gripping a data sheet from the stack in said feed tray and for feeding the vacuum-gripped data sheet to the transport unit, said transport unit including driven rotatable means disposed on opposite sides of stationary means to define a chamber, said stationary means having perforations that extend into said chamber through a limited peripheral portion of the stationary means and through which a vacuum is drawn for holding a data sheet against the driven rotatable means only while the driven rotatable means drives the data sheet about a limited peripheral portion of the rotary transport unit whereby the data sheet is ejected from the rotary transport unit as it is driven past the end of this limited peripheral portion of the transport unit, a receiving tray disposed beneath said feed tray for receiving ejected data sheets from said rotary transport unit in the same order as they are originally placed in the feed tray, and an optical reader unit disposed adjacent to the limited peripheral portion of the rotary transport unit for producing signals corresponding to the data on the data sheets driven past the optical reader unit by the rotary transport unit.

13. A rotary transport unit for gripping and moving a flexible sheet past a line, said rotary transport unit comprising a pair of like parallel spaced discs, a stationary member having mounting means extending from one side thereof and having a generally annular wall with parellel edges disposed between and in close proximity to said discs to define a chamber with at least one peripheral opening through which a vacuum is drawn, said discs extending radially outward of said annular wall a slight distance, and a shaft extending through said stationary member in rotatable relation thereto and fixed to said discs for rotating them to move a sheet placed across said discs and held by vacuum thereagainst.

14. A rotary transport unit as set forth in claim 13 wherein said shaft is hollow with at least one perforation extending radially therethrough into said chamber and said transport unit includes vacuum means connected to said shaft for drawing a vacuum therein and thus through the peripheral opening of said chamber.

15. A vacuum pickup for lifting individual sheets from a stack thereof, said pickup comprising an elongated pivotally mounted housing, a pair of closely-spaced parallel rollers rotatably mounted in said housing in close proximity to walls of the housing, a vacuum manifold in said housing and opening between said rollers to draw air therebetween for vacuum gripping a sheet from a stack, said rollers extending slightly out of said housing along their length for engaging the vacuum-gripped sheet and, when the housing is pivoted away from the stack of sheets, being rotated for moving the vacuum-gripped sheet picked up from the stack.

16. A vacuum pickup as set forth in claim 15 wherein at least the peripheral surface of said rollers is formed of a material having a substantially high coefficient of friction with the sheets to be picked up for maximizing the moving action of the rotating rollers.

References Cited

UNITED STATES PATENTS

| | | | |
|---|---|---|---|
| 2,752,154 | 6/1956 | Nelson. | |
| 3,024,982 | 3/1962 | Algier et al. | 235—61.11 |
| 3,352,417 | 11/1967 | Cutaia | 235—61.7 X |

DARYL W. COOK Primary Examiner

U.S Cl. X.R.

271—11, 26